(12) United States Patent
Haines et al.

(10) Patent No.: US 8,131,602 B2
(45) Date of Patent: Mar. 6, 2012

(54) IMAGING DEVICE CONFIGURATION METHODS AND IMAGING DEVICE MANAGEMENT METHODS

(75) Inventors: Robert E. Haines, Boise, ID (US); Mark A. Harper, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 12/072,868

(22) Filed: Feb. 28, 2008

(65) Prior Publication Data

US 2008/0215454 A1    Sep. 4, 2008

Related U.S. Application Data

(62) Division of application No. 09/976,642, filed on Oct. 11, 2001, now abandoned.

(51) Int. Cl.
*G06Q 30/00* (2006.01)
(52) U.S. Cl. ....................... 705/27.1; 705/26.1
(58) Field of Classification Search .............. 705/26, 705/27
See application file for complete search history.

(56) References Cited

U.S. PATENT DOCUMENTS

| | | |
|---|---|---|
| 4,001,743 A | 1/1977 | Arnhold |
| 5,077,582 A | 12/1991 | Kravette et al. |
| 5,305,199 A | 4/1994 | LoBiondo et al. |
| 5,445,295 A | 8/1995 | Brown |
| 5,517,617 A | 5/1996 | Sathaye et al. |
| 5,537,626 A | 7/1996 | Kraslavsky et al. |
| 5,580,177 A | 12/1996 | Gase et al. |
| 5,613,160 A | 3/1997 | Kraslavsky et al. |
| 5,647,056 A | 7/1997 | Barrett et al. |
| 5,768,583 A | 6/1998 | Orzol et al. |
| 5,819,107 A | 10/1998 | Lichtman et al. |
| 5,819,110 A | 10/1998 | Motoyama |
| 5,838,907 A | 11/1998 | Hansen |
| 5,935,228 A | 8/1999 | Shinomura |
| 5,956,487 A | 9/1999 | Venkatraman et al. |
| 5,960,214 A | 9/1999 | Sharpe et al. |
| 6,006,279 A | 12/1999 | Hayes |
| 6,012,098 A | 1/2000 | Bayeh et al. |
| 6,023,585 A | 2/2000 | Perlman et al. |
| 6,023,593 A | 2/2000 | Tomidokoro |
| 6,101,407 A | 8/2000 | Groezinger |
| 6,108,099 A | 8/2000 | Ohtani |
| 6,112,235 A | 8/2000 | Spofford |
| 6,115,737 A | 9/2000 | Ely et al. |
| 6,144,945 A | 11/2000 | Garg et al. |

(Continued)

FOREIGN PATENT DOCUMENTS

DE    19704694    8/1997

(Continued)

OTHER PUBLICATIONS

U.S. Appl. No. 09/648,664; filed Aug. 25, 2000; "Output Engine Consumable Supply Management and Method"; PDNO. 10003345-1; 19 pp.

(Continued)

*Primary Examiner* — Robert M. Pond (57) ABSTRACT

A method includes determining, by a processor within a peripheral device, that an amount of a consumable associated with the peripheral device has decreased below a predetermined threshold and transmitting an email from the peripheral device to order additional supplies of the consumable.

20 Claims, 5 Drawing Sheets

U.S. PATENT DOCUMENTS

| | | |
|---|---|---|
| 6,222,538 B1 | 4/2001 | Anderson |
| 6,233,409 B1 | 5/2001 | Haines et al. |
| 6,301,449 B1 | 10/2001 | Miura |
| 6,308,205 B1 | 10/2001 | Carcerano et al. |
| 6,317,570 B1 | 11/2001 | Uchida et al. |
| 6,327,613 B1 | 12/2001 | Goshey et al. |
| 6,333,790 B1 | 12/2001 | Kageyama |
| 6,341,271 B1 | 1/2002 | Salvo et al. |
| 6,345,294 B1 | 2/2002 | O'Toole et al. |
| 6,375,298 B2 | 4/2002 | Purcell et al. |
| 6,405,178 B1 | 6/2002 | Manchala et al. |
| 6,405,204 B1 | 6/2002 | Baker et al. |
| 6,418,416 B1 | 7/2002 | Rosenberg et al. |
| 6,424,424 B1 | 7/2002 | Lomas et al. |
| 6,426,799 B1 | 7/2002 | Okimoto et al. |
| 6,430,711 B1 | 8/2002 | Sekizawa |
| 6,484,182 B1 | 11/2002 | Dunphy et al. |
| 6,487,609 B1 | 11/2002 | Blackwood et al. |
| 6,519,632 B1 | 2/2003 | Brackett et al. |
| 6,522,421 B2 | 2/2003 | Chapman et al. |
| 6,581,092 B1 | 6/2003 | Motoyama et al. |
| 6,591,358 B2 | 7/2003 | Jaffrey |
| 6,628,415 B2 | 9/2003 | Lawrence et al. |
| 6,629,134 B2 | 9/2003 | Hayward et al. |
| 6,668,376 B1 | 12/2003 | Wang et al. |
| 6,674,764 B1 | 1/2004 | Garland et al. |
| 6,690,481 B1 | 2/2004 | Yeung et al. |
| 6,714,744 B2 | 3/2004 | Arima |
| 6,754,829 B1 | 6/2004 | Butt et al. |
| 6,757,714 B1 | 6/2004 | Hansen |
| 6,779,004 B1 | 8/2004 | Zintel |
| 6,782,474 B1 | 8/2004 | Ylonen |
| 6,798,997 B1 | 9/2004 | Hayward |
| 6,804,718 B1 | 10/2004 | Pang et al. |
| 6,892,317 B1 | 5/2005 | Sampath et al. |
| 6,895,588 B1 | 5/2005 | Ruberg |
| 6,952,731 B2 | 10/2005 | Picca et al. |
| 6,963,851 B1 | 11/2005 | Szabo et al. |
| 6,968,356 B1 * | 11/2005 | Lakhdir ........................ 709/203 |
| 7,010,695 B1 | 3/2006 | Mizuguchi |
| 2001/0016122 A1 | 8/2001 | Arima |
| 2002/0059415 A1 | 5/2002 | Chang et al. |
| 2002/0065873 A1 | 5/2002 | Ishizuka |
| 2002/0078200 A1 | 6/2002 | Helms |
| 2002/0078377 A1 | 6/2002 | Chang et al. |
| 2002/0100036 A1 | 7/2002 | Moshir et al. |
| 2002/0112080 A1 | 8/2002 | Millin et al. |
| 2002/0181010 A1 | 12/2002 | Pineau |
| 2002/0196463 A1 | 12/2002 | Schlonski et al. |
| 2002/0198969 A1 | 12/2002 | Engel et al. |
| 2003/0037122 A1 | 2/2003 | Picca et al. |
| 2003/0072027 A1 | 4/2003 | Haines et al. |
| 2003/0074268 A1 | 4/2003 | Haines et al. |
| 2003/0074427 A1 | 4/2003 | Haines et al. |
| 2003/0074428 A1 | 4/2003 | Haines |
| 2003/0074442 A1 | 4/2003 | Haines |
| 2003/0074547 A1 | 4/2003 | Haines |
| 2003/0137188 A1 | 7/2003 | Brown |
| 2003/0200301 A1 | 10/2003 | Trzcinko et al. |
| 2005/0071683 A1 | 3/2005 | Mizuguchi |
| 2006/0028682 A1 | 2/2006 | Haines |
| 2007/0022180 A1 | 1/2007 | Cocotis et al. |

FOREIGN PATENT DOCUMENTS

| | | |
|---|---|---|
| DE | 19618962 | 11/1997 |
| EP | 0685768 A1 | 12/1995 |
| EP | 822473 A2 | 2/1998 |
| EP | 0822473 A3 | 2/1998 |
| EP | 0838768 A2 | 4/1998 |
| EP | 0843268 A2 | 5/1998 |
| EP | 0847008 A2 | 6/1998 |
| EP | 01039692 A2 | 9/2000 |
| EP | 1085441 A2 | 3/2001 |
| EP | 1085441 A3 | 3/2001 |
| EP | 1085442 A2 | 3/2001 |
| EP | 1085442 A3 | 3/2001 |
| EP | 1239407 A1 | 9/2002 |
| EP | 1239407 A2 | 9/2002 |
| EP | 1239407 A3 | 9/2002 |
| GB | 2360658 A | 9/2001 |
| GB | 2371129 | 7/2002 |
| GB | 2371892 A | 8/2002 |
| JP | 10269107 | 10/1998 |
| JP | 10301800 | 11/1998 |
| JP | 2000187698 | 7/2000 |
| JP | 2001103233 | 4/2001 |
| JP | 2001154823 | 6/2001 |
| JP | 2001195216 | 7/2001 |
| JP | 2001229089 | 8/2001 |
| JP | 2001246822 | 9/2001 |
| WO | WO 99/15990 | 4/1999 |
| WO | WO 00/01138 A2 | 1/2000 |
| WO | WO 00/55740 | 9/2000 |
| WO | WO 01/63489 | 8/2001 |
| WO | WO 01/67267 A1 | 9/2001 |
| WO | WO 02/27527 A1 | 4/2002 |
| WO | WO 02/31741 A1 | 4/2002 |

OTHER PUBLICATIONS

"How Ethernet Works"; http://computer.howstuffworks/ethernet.htm/printable; 1998; 9 pp.

Efficient configuration data transmission scheme for FPGA-based downloadable software radio communication systems; Honda et al.; IEEE VTC 54th, vol. 3, Oct. 2001; pp. 1388-1382.

GB 0119834.0; UK Search Report; May 29, 2002; 3 pp.

Mimeo Homepage; http://web.archive.org/web/20010712203858/http://www.mimeo.com; Jul. 12, 2001; 2pp.

Vistaprint; http://web.archive.org/web/20010515224625/www.vistaprint.co.uk; Mar. 9, 2001; 2pp.

Weprintcolour; http://web.archive.org/web/20010721135726 . . . ; Sep. 24, 2001; 4pp.

Definition of "hot link"; www.webopedia.com; 2004; 2 pp.

Communication Networks: Fundamental Concepts and Key Architectures; Leo-Garcia, A.; McGraw-Hill 2nd Ed.; 2000-2004; pp. 52-59.

"ITEC Positions Its Embedded Controller Technology to Address the Growing Internet Appliance Marketplace"; Business Editors' Business Wire; Feb. 28, 2000; 3 pp.

"i-copiers and i-printers give dealers the right connections"; Office World News; vol. 28, Iss. 10; Oct. 2000; 4 pp.

"Xerox upgrades network laser printer family with industry-leading Internet Printing"; M2 Presswire; Jun. 23, 1999; Proquest #42944909; 3 pp.

"Internet Appliances receive, send e-mail"; Steinfeld, E.; Internet Appliances:, Electronic Engineering Times; Mar. 1, 1999; Proquest #39456120; 2 pp.

Designing the next step in Internet appliances; Peisel, G.; Internet Appliances, Electronic Design; Mar. 23, 1998; Proquest #28204215; 6 pp.

"Painless printer management"; Harbaugh, L.; Apr. 13, 1998; Proquest #28667470; 5 pp.

Proquest: Summary of web search conducted on Jul. 23, 2005; prior publication date Oct. 10, 1997; 1 p.

Proquest: Summary of web search conducted on Jul. 23, 2005; prior publication date Oct. 10, 2000; 1 p.

"Outside the Box"; Baker, G.; New Zealand Management; Aug. 2000; Proquest #58193134; 6 pp.

"Thin-client heads product introductions"; Trembly, A; National Underwriter; Aug. 30, 1999; Proquest #6326094; 4 pp.

"Internet Printing Protocol Standards now available; Broadly supported printing industry effort acheieves major milestone"; Buisiness Wire; Oct. 4, 2000; Proquest #62046173; 3 pp.

* cited by examiner

FIG. 1

IMAGING DEVICE CONFIGURATION METHODS AND IMAGING DEVICE MANAGEMENT METHODS

CROSS REFERENCE TO RELATED APPLICATION

This is a Divisional Application of Ser. No. 09/976,642 filed on Oct. 11, 2001 now abandoned, the disclosure of which is incorporated by reference.

COPYRIGHT NOTICE

Contained herein is material, including material incorporated by reference, which is subject to copyright protection. The copyright owner does not object to the electronic, facsimile or electrophotographic reproduction of the patent disclosure by any person as it appears in the Patent and Trademark Office patent files or records, but otherwise reserves all rights to the copyright whatsoever.

FIELD OF THE INVENTION

The invention relates to printers and other hard copy output engines. More particularly, the invention relates to hard copy output engine consumable supply management and related methods.

BACKGROUND OF THE INVENTION

As computer systems and data communications systems have developed, the number and variety of hard copy output engines employed in a typical office or factory setting has grown. Examples include photo copiers, facsimile machines, printers and devices including more than one of these capabilities. In turn, this has led to a need to be able to order greater number of consumable supplies, some of which are specific to specific types of hard copy output engines.

As need for these types of hard copy output engines has grown, a number of different manufacturers have developed different hard copy output engines providing different operational characteristics and capabilities. While some consumable commodities associated with these devices are common to most or all such devices (e.g., standardized paper sizes), other consumable commodities, such as toners and toner supply cartridges or ink reservoirs, tend to be unique to a specific manufacturer. Additionally, different hard copy output engines may have different paper capacities, capabilities for accepting more or fewer paper sizes and different toner or other pigment supply requirements and capacities.

It is generally helpful to have a mechanism for keeping track of usage of consumable commodities in keeping computer systems functional, and to determine when periodic or aperiodic maintenance is desirable. For example, it is extremely helpful to ensure that adequate supplies of replacement print media and pigmentation or marker material are available when needed.

Coordination of orders for supplies can be very helpful to avoid over- or under-stocking of these consumable commodities, while still achieving the benefits of economies of scale by pooling orders to service multiple hard copy output engines, especially those using at least some of the same consumable commodities. However, in many business settings, the sheer number of diverse hard copy output engines being used in different aspects or divisions of the business may lead to confusion in maintaining adequate supplies of these consumable commodities.

What is needed is a way to facilitate provision of data providing a communications link to suppliers of consumable commodities, as well as data describing consumable commodity status, for a network including one or more hard copy output engines.

SUMMARY OF THE INVENTION

In accordance with an aspect of the present invention, a method includes determining, by a processor within a peripheral device, that an amount of a consumable associated with the peripheral device has decreased below a predetermined threshold and transmitting an email from the peripheral device to order additional supplies of the consumable.

In accordance with another aspect of the present invention, an article of manufacture includes a computer usable medium having computer readable code embodied therein that is configured to cause a processor contained in a peripheral device to (i) determine that an amount of a consumable associated with the peripheral device has decreased below a predetermined threshold and (ii) transmit an email from the peripheral device to order additional supplies of the consumable.

In accordance with yet another aspect of the present invention, a computer implemented control system for a hard copy output engine includes a memory configured to store a software module and processing circuitry. The processing circuitry is configured to employ the software module to determine that an amount of a consumable associated with a peripheral device has decreased below a predetermined threshold and transmit an email from the peripheral device to order additional supplies of the consumable.

Other features and advantages of the invention will become apparent to those of ordinary skill in the art upon review of the following detailed description, claims and drawings.

DESCRIPTION OF THE DRAWINGS

FIG. 7 is a simplified flow chart of a process P6 in accordance with an embodiment of the present invention.

DETAILED DESCRIPTION OF THE INVENTION

Figure 1:
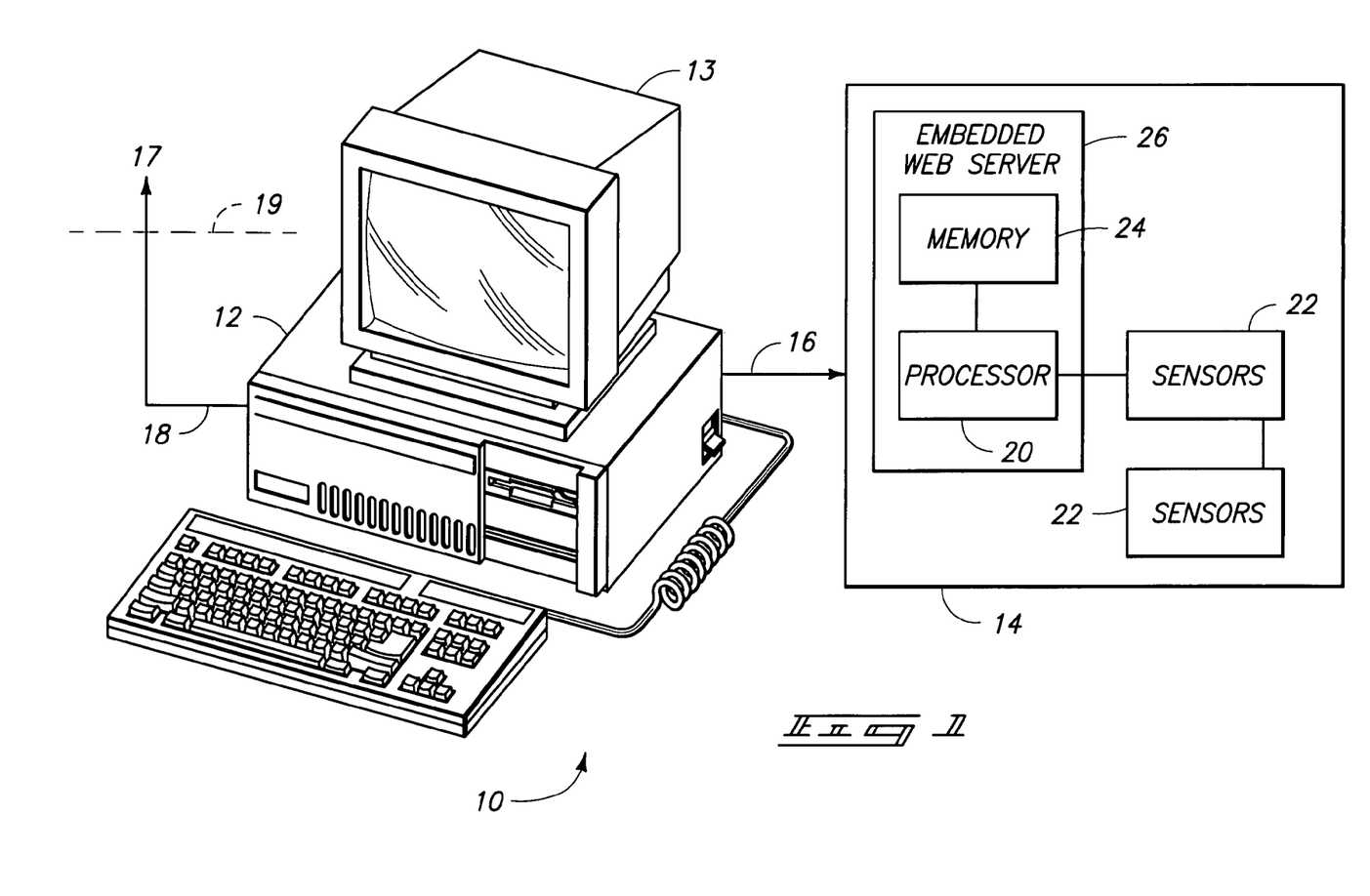
FIG. 1 is a simplified block diagram of a computer network including a computer, a hard copy output engine and a firewall, in accordance with an embodiment of the present invention.

FIG. 1 is a simplified block diagram of a computer network 10 including a computer 12 and a hard copy output engine 14, in accordance with an embodiment of the present invention. The computer 12 is coupled to the hard copy output engine 14 via a bus 16 allowing either the computer 12 or the hard copy output engine 14 to initiate data communications with the other. In one embodiment, the hard copy output engine 14 is a device such as a printer, copier, facsimile machine or a multifunction device capable of providing two or more such functions. It will be appreciated that while FIG. 1 illustrates only a single computer 12 and a single peripheral device 14 for ease of illustration and convenience in understanding, multiple computers 12 and peripheral devices 14 may all be coupled to the bus 16.

In one embodiment, the system 10 is coupled to an external interconnection 17 via a data path 18. In one embodiment, the data path 18 includes an intranet. In one embodiment, the data path 18 includes a local area network (LAN) or wide area network (WAN). In one embodiment, the data path 18 includes access to the Internet via a firewall 19.

Security is a constant challenge for networks and computing engineers responsible for networks, and is discussed in commonly-assigned U.S. Pat. No. 6,192,410 B1, entitled "Methods And Structures For Robust, Reliable file Exchange Between Secured Systems", issued to Miller et al. and which is hereby incorporated herein by reference. In particular, and as discussed in the afore-noted patent, it is important in wide area network applications for computing systems attached to such a network to secure their resources from inappropriate, unauthorized access. The Internet is an example of a global wide area network where security measures are often critical to an ongoing business enterprise connected to the Internet Such security measures are required to assure that unauthorized third parties, anywhere in the world, cannot gain access to sensitive materials within the enterprise via the global, publicly accessible, Internet.

Though such security measures or firewalls 19 are vital to secure each particular enterprise, their very existence creates the burden for those trying to legitimately exchange information between enterprises via such global, public networks. A user in one particular computing enterprise encounters a number of difficulties exchanging data with another user in a different computing enterprise via computer system to computer system network communication links. Though the communication capability may exist, for example via the Internet, safeguards and security measures (firewalls 19) within each enterprise makes such enterprise-to-enterprise exchanges difficult—exactly as they are intended to do.

In general, such firewall 19 security measures operate at lower layers of the network communication layered model to filter out potentially harmful network data exchange. For example, the firewall 19 may permit certain protocols to be exchanged only among certain network devices known to be physically secured within the enterprise. Network devices not within the permitted scope of secured devices are not permitted to use the filtered protocols. Should such un-authorized devices attempt such communications, the firewall 19 simply discards their network data transfer requests. As a result, a vendor may not be able to initiate data communications between a database maintained by the vendor and devices that have been deployed at clients of that vendor or allied vendors.

In one embodiment, the computer 12 and the hard copy output engine 14 are capable of exchanging data via a protocol compatible with presence of other computers 12 or hard copy output engines 14 on the bus 16. In one embodiment, the computer 12 and the hard copy output engine 14 employ an object-oriented request-reply protocol supporting asynchronous printer query, control and monitor capabilities, and that is capable of documenting the requests, replies and data types supported by the protocol. In one embodiment, a protocol known as PML is used.

The term "PML" refers to Printer Management Language, which has been developed by the Hewlett-Packard Company of Palo Alto, Calif. Further description of PML can be found at http://www.hp.com or at http://www.hpdevelopersolutions.com, by entering a user name, a user selected password, and by joining a solutions provider program. More particularly, a PML Protocol Specification, Hewlett-Packard Company. Nov. 18, 1998, Revision 2.3 is available therein, and is hereby incorporated herein by reference.

One exemplary remote query language implemented within the network system is a Simple Network Management Protocol (SNMP). In such an exemplary configuration, host devices such as personal computers 12 include respective processing circuitry (not shown) operable to formulate an appropriate SNMP query or request which is addressed to one or more appropriate computer peripheral devices using a communication medium. The appropriate computer peripheral device(s) receive the query or request and provide information back to appropriate host devices or computers 12 using the communication medium. Protocols other than SNMP are utilized in other embodiments to implement communications within the system.

PML permits many applications to exchange device management information with numerous computer peripheral devices, such as image forming devices. Individual computer peripheral devices implement any conversion operations between the protocol used to exchange information with respect to computer peripheral devices (e.g., SNMP) and the internal protocol (e.g., PML) used within the respective computer peripheral devices.

In one embodiment, the data path 18 provides common gateway interface (CGI) data communication capability. In one embodiment, the data path 18 includes an email capability (e.g., simple mail transfer protocol or SMTP) for facilitating data communication. In one embodiment, the data path 18 includes a secure data path using HTTP (hyper text transfer protocol) with SSL (secure sockets layer), as is described in more detail in U.S. Pat. No. 5,657,390, entitled "Secure Socket Layer Application Program Apparatus And Method", issued to Elgamal et al. and U.S. Pat. No. 6,081,900, entitled "Secure Intranet Access", issued to Subramanian et al., which patents are hereby incorporated herein by reference for their teachings.

The hard copy output engine 14 includes a controller 20, such as a conventional microprocessor or microcontroller. The hard copy output engine 14 also includes one or more sensors 22 coupled to the controller 20 and a memory 24 in data communication with the controller 20. In one embodiment, the memory 24 comprises conventional volatile and non-volatile memory units. In one embodiment, the memory 24 includes magnetic, magneto-optic or optical storage media, such as conventional disc storage or floppy disc data storage units, or memory integrated circuits or CD-ROMs or the like. In one embodiment, the hard copy output engine 14 accepts instructions as a computer instruction signal embodied in a carrier wave carrying instructions executable by the controller 20.

The sensors 22 are coupled to consumable commodities associated with the hard copy output engine 14. In one embodiment, when the sensors 22 report that a quantity of a consumable commodity (e.g., print media, paper, toner or ink) associated with the hard copy output engine 14 has decreased to below a predetermined threshold amount, or that malfunction of a dispenser of a consumable commodity exists, the controller 20 initiates a data communication ultimately intended for transmission via the data path 18. Additionally, the sensors 22 may track data such as number of sheets of media that have been printed, in order to schedule maintenance operations.

The controller 20 and the memory 24 also comprise an embedded web server 26. Embedded web server 26 refers to a web server that is completely contained within a device, such as a computer peripheral device. Embedded web servers 26 are configured to provide management information about the peripheral device. An embedded web server 26 can be used to manage or manipulate individual peripheral devices, such as the hard copy output engine 14, that are present in the network 10. A web browser can be used by a network user to access an embedded web server 26 in order to obtain device status updates, perform troubleshooting operations, change device configuration settings and to link to online customer support.

The term "web server" refers to an application that runs on a workstation or personal computer 12 within the network environment 10, that lets users view HTML documents via the Internet, to access hyperlinks and to transfer files. In operation, web browsers request information from web servers and display the information that the web servers send back. The information is organized into pages containing text, graphics, sound and animation formatted by HTML and Java® applets.

The term "web server" refers to a specialized program running on a server that supports TCP/IP protocol. Web servers enable workstations or personal computers 12 or other devices in the network 10 to access external networks such as the Internet. Web servers receive HTTP requests that browsers running on various types of computer systems send. The web server could be asked to get a text or graphics file, retrieve a ZIP file or run a program. The web server then sends the information, files or program results back to the requesting browser. Embedded web servers 26 are contained within the hard copy output engine 14 itself to provide management information about the hard copy output engine 14.

Figure 2:
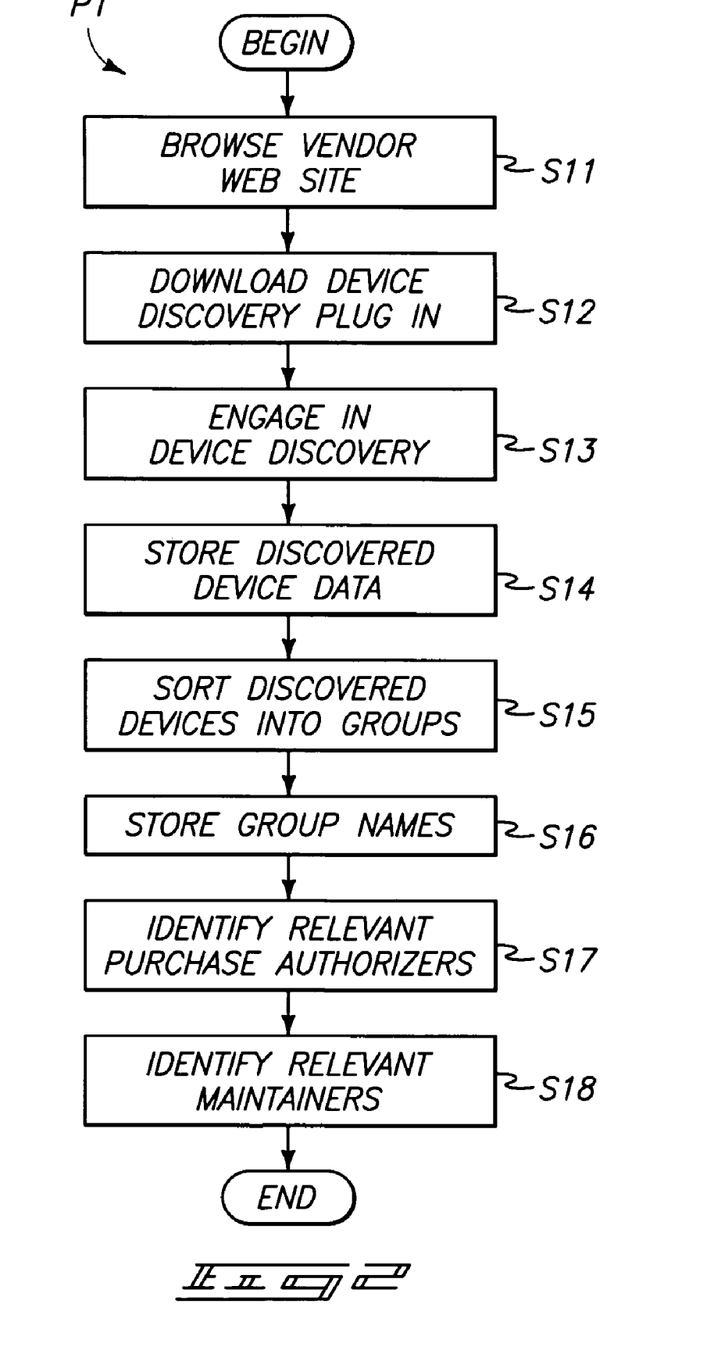
FIG. 2 is a simplified flow chart of a process P1 illustrating how a system can interact with a vendor website across the firewall of FIG. 1 to enable a peripheral device, such as the hard copy output engine, to exchange information with a vendor website via an embedded web server, in accordance with an embodiment of the present invention.

FIG. 2 is a simplified flow chart of a process P1 illustrating how a system can interact with a vendor website across the firewall 19 of FIG. 1 to enable a peripheral device, such as the hard copy output engine 14, to exchange information with the vendor website via the embedded web server 26, in accordance with an embodiment of the present invention.

Initially, it is desirable to provide the vendor site with a list of system components, such as peripheral devices, associated with that vendor. This process is called "device discovery". Device discovery needs to take place at least once for each device that is to be supported via the vendor website.

The process P1 is initiated when the MIS manager browses the vendor website in a step S11.

In a step S12, the MIS manager downloads a device discovery plug in via the web browser contained in the MIS manager's computer 12.

In a step S13, the device discovery plug in engages in device discovery, that is, inventories peripheral devices that are coupled to the bus 16 that are also associated with that vendor. In one embodiment, the device discovery plug in includes information entered by the MIS manager regarding peripheral devices that the MIS manager knows have been added to the system or that have been modified.

In one embodiment, the device discovery plug in acts as a proxy for the vendor web site within the network 10 to poll and identify peripheral devices and their addresses in the network 10 that are associated with that vendor. In one embodiment, peripheral devices are identified via serial numbers. In one embodiment, the device discovery plug in determines make and model number, as well as options, for each peripheral device associated with that vendor.

In a step S14, the discovered device information is stored for reference. In one embodiment, the device information is stored in memory associated with the vendor website.

In a step S15, the device information is sorted into suitable groups. For example, peripheral devices may be grouped according to internal business structures associated with the network 10, e.g., research and development, accounting etc. that may also correspond to specific areas within a facility.

In a step S16, group names are stored for reference. In one embodiment, the group names and data relevant to the individual devices are stored in a memory associated with the vendor web site.

In a step S17, a purchase authorizer is identified for each of the groups determined in the step S15. The purchase authorizer is responsible for authorizing purchases of consumables associated with the peripheral devices and for authorizing periodic and aperiodic maintenance. Additionally, the vendor may provide information to the purchase authorizer regarding product upgrades or accessories as these become available.

In a step S18, maintainers are identified for the groups identified in the step S15. In one embodiment, email addresses for maintainers are collated with the groups identified in the step S16. In one embodiment, the email addresses are stored with the groups in a memory associated with the vendor web site.

The process P1 then ends. The process P1 provides a way for a vendor website to obtain information from a private network 10 across the firewall 19 without compromise of the security of the private network 10. The process P1 also does not require any added hardware for the network 10.

Figure 3:
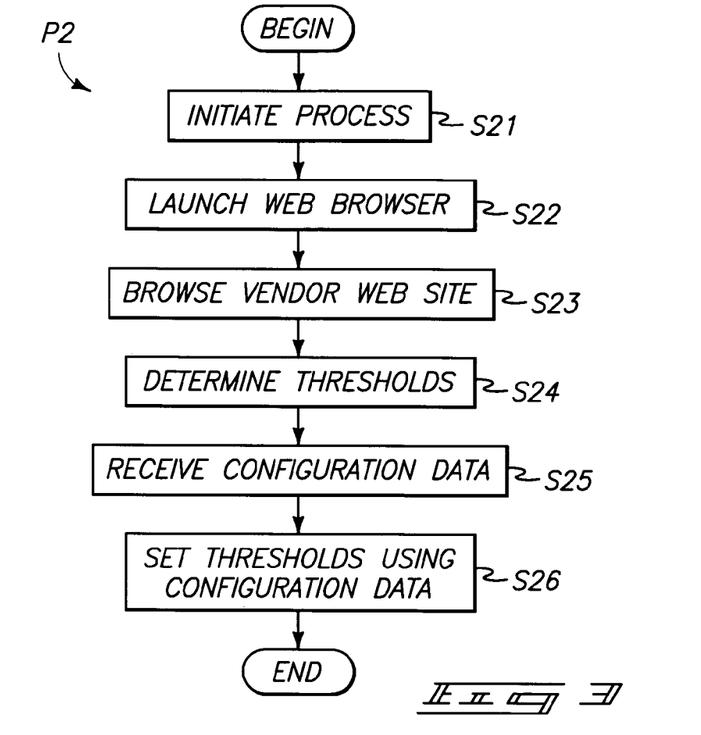
FIG. 3 is a flow chart illustrating steps in carrying out a process P2 for configuring devices discovered in the process P1 of FIG. 2, in accordance with an embodiment of the present invention.

FIG. 3 is a flow chart illustrating steps in carrying out a process P2 for configuring the devices that were discovered in the process P1 of FIG. 2, in accordance with an embodiment of the present invention. The process P2 begins in a step S21.

Optionally, the process P2 may be initiated by the vendor web site sending an email to the maintainer in the step S21 using the email address obtained in the step S18 of the process P1 of FIG. 2. The email may include information specific to the group of devices identified as being associated with that maintainer in the step S18 of the process P1.

Alternatively, the process P2 may be initiated by the maintainer of the peripheral devices. In either case, the maintainer launches a web browser to interact with the vendor web site in a step S22. In one embodiment, the maintainer launches the web browser using a URL contained in the email message received by the maintainer in the step S21. In one embodiment, the URL is specific to the list of peripheral devices associated with the maintainer.

In a step S23, the maintainer browses the vendor web site to configure a portion of the vendor web site. In one embodiment, the maintainer sets maintenance notification thresholds. For example, some types of maintenance may be set to take place after a predetermined number of sheets of media have been printed, or following a predetermined number of hours of operation, or may be based on other operation-dependent or seasonal criteria.

In a step S24, the maintainer sets thresholds for replenishment of consumables. In one embodiment, these are set via interaction with the vendor web site.

In a step S25, the vendor web site collates the thresholds set by the maintainer and sends back an electronic message including configuration data to be used by the embedded web server 26 in the peripheral device. In one embodiment, an email including a hotlink having an attached CGI script or an XML list is sent from the vendor web site to the maintainer. A hotlink is an Internet address, usually in the form of a URL (universal resource locator) that can be readily activated, for example by selecting it with a mouse or other tactile input device, to access the web site at that Internet address.

In a step S26, the maintainer then uses this electronic communication to set the thresholds in the peripheral device via the embedded web server 26.

In one embodiment, the vendor web site provides a hot link at the vendor web site that, when activated by the maintainer, performs substantially the equivalent of the steps S25 and S26.

In one embodiment, the vendor web site may send an email directly to the embedded web server with the configuration data in the step S25. The embedded web server 26 then uses this electronic communication to set the thresholds in the peripheral device via the embedded web server in the step S26. In one embodiment, the email may be sent to a system administrator to be forwarded to the peripheral device. This allows additional screening to address potential security concerns.

In one embodiment, a device configuration plug in becomes part of the browser. The plug in takes the configuration data from the vendor web site and configures the peripheral. In one embodiment, SNMP is used to configure PML objects to configure the peripheral.

For example, the maintainer may need to be aware of an upcoming shortfall of media or pigmentation or marking material and thus may want to have the re-ordering process start when the supply falls to a predetermined level. Alternatively, the maintainer may prefer to have the re-ordering process initiate when the consumable is essentially depleted. Additionally, the maintainer may want to pool consumable orders over a group of peripherals or over time. The maintainer may also want to coordinate maintenance of local stocks of consumables with changes in consumption, and may opt to replace some consumables that would not otherwise be replaced when other consumables require replacement (e.g., replace a low toner cartridge of one color when another toner cartridge is exhausted) in order to optimize labor content.

The process P2 then ends.

Figure 4:
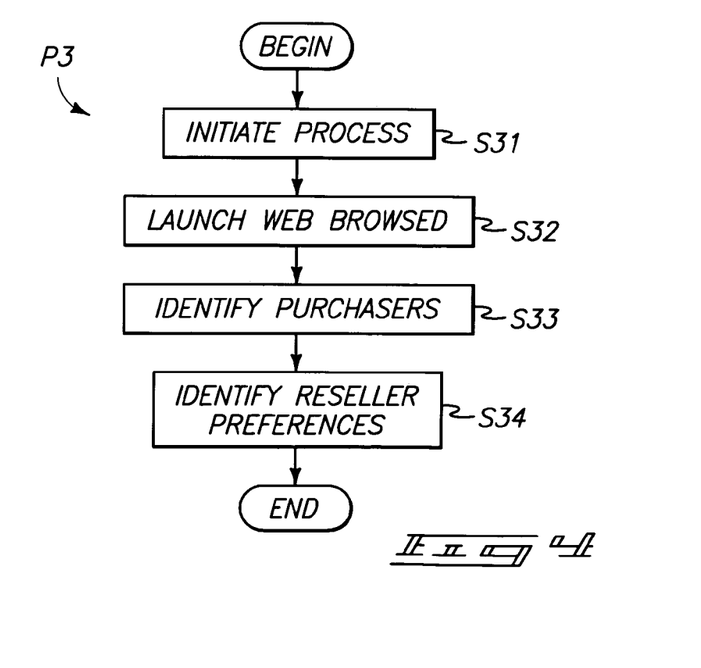
FIG. 4 is a flow chart illustrating steps in carrying out a process P3 for setting preferences for resellers and for identifying purchasers for consumables and service for devices discovered in the process P1 of FIG. 2, in accordance with an embodiment of the present invention.

FIG. 4 is a flow chart illustrating steps in carrying out a process P3 for setting preferences for resellers and for identifying purchasers for consumables and service for the devices that were discovered in the process P1 of FIG. 2, in accordance with an embodiment of the present invention. The process P3 begins in a step S31.

Optionally, the process P3 may be initiated by the vendor web site sending an email to the purchase authorizer in the step S31 using the email address obtained in the step S17 of the process P1. The email may include information specific to the group of devices identified as being associated with that purchase authorizer and maintainer in the step S18 of the process P1.

Alternatively, the process P3 may be initiated by the purchase authorizer for consumables for the peripheral devices. In either case, the purchase authorizer launches a web browser to interact with the vendor web site in a step S32. In one embodiment, the purchase authorizer launches the web browser using a URL contained in the email message received by the maintainer in the step S31. In one embodiment, the URL is specific to the list of peripheral devices associated with the purchase authorizer.

In a step S33, the purchase authorizer identifies purchasers associated with the group of peripheral devices identified in the process P1. In one embodiment, the purchase authorizer provides email addresses for the purchasers, and these may be stored in a memory associated with the vendor web site.

In a step S34, the purchase authorizer identifies preferred resellers of consumables for the peripheral devices, and these may be stored in a memory associated with the vendor web site.

The process P3 then ends.

Figure 5:
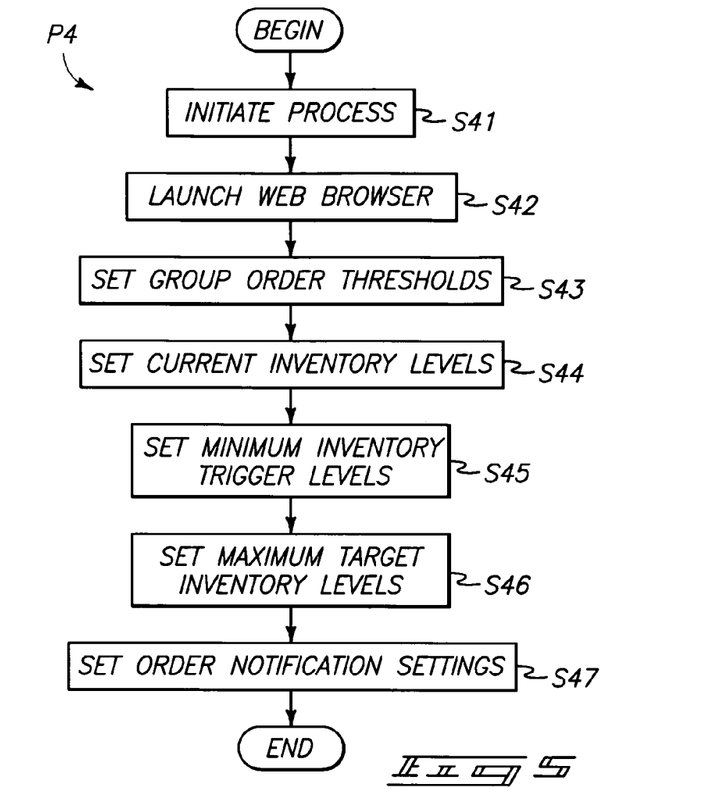
FIG. 5 is a simplified flow chart of a process P4 for setting inventory parameters for the group or groups of peripheral devices identified in the process P1 of FIG. 2, in accordance with an embodiment of the present invention.

FIG. 5 is a simplified flow chart of a process P4 for setting inventory parameters for the group or groups of peripheral devices identified in the steps S15 and S16 of the process P1 of FIG. 2, in accordance with an embodiment of the present invention. The process P4 begins in a step S41.

Optionally, the process P4 may be initiated by the vendor web site sending an email to the purchaser in the step S41 using the email address obtained in the step S17 of the process P1. The email may include information specific to the group of devices identified as being associated with that maintainer in the step S33 of the process P3.

Alternatively, the process P4 may be initiated by the purchaser for consumables for the peripheral devices. In either case, the purchaser launches a web browser to interact with the vendor web site in a step S42. In one embodiment, the purchaser launches the web browser using a URL contained in the email message received by the purchaser in the step S41. In one embodiment, the URL is specific to the list of peripheral devices associated with the purchaser.

In a step S43, the purchaser may set group order threshold settings, and these may be stored in a memory associated with the vendor web site. This may be used to combine orders to service needs for a group of peripheral devices using a local store of consumables as a buffer.

In a step S44, the purchaser may set current inventory levels for the local store of consumables, and these may be stored in a memory associated with the vendor web site.

In a step S45, the purchaser sets minimum inventory order trigger thresholds, and these may be stored in a memory associated with the vendor web site.

In a step S46, the purchaser sets maximum target inventory levels, and these may be stored in a memory associated with the vendor web site.

In a step S47, the purchaser sets order notification settings, and these may be stored in a memory associated with the vendor web site.

The process P4 then ends.

Figure 6:
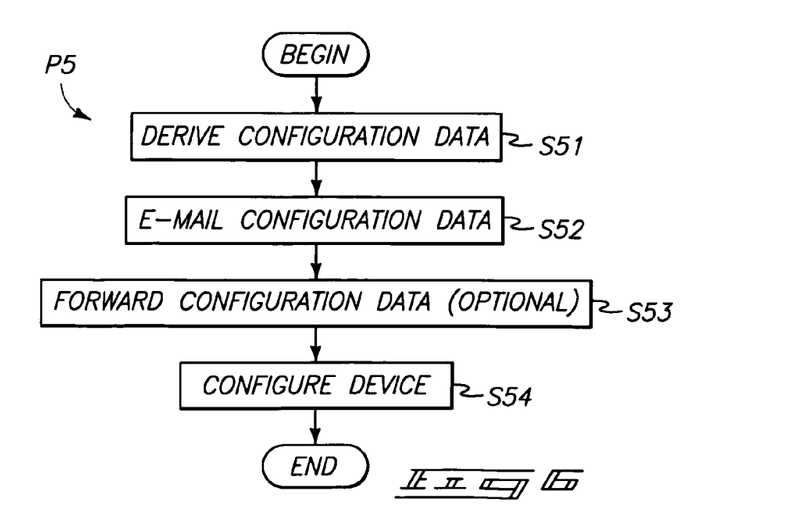
FIG. 6 is a simplified flowchart of a process P5 for configuring a peripheral device, such as a hard copy output engine, using information collected via the processes of FIGS. 2 through 5, in accordance with an embodiment of the present invention.
Figure 11:
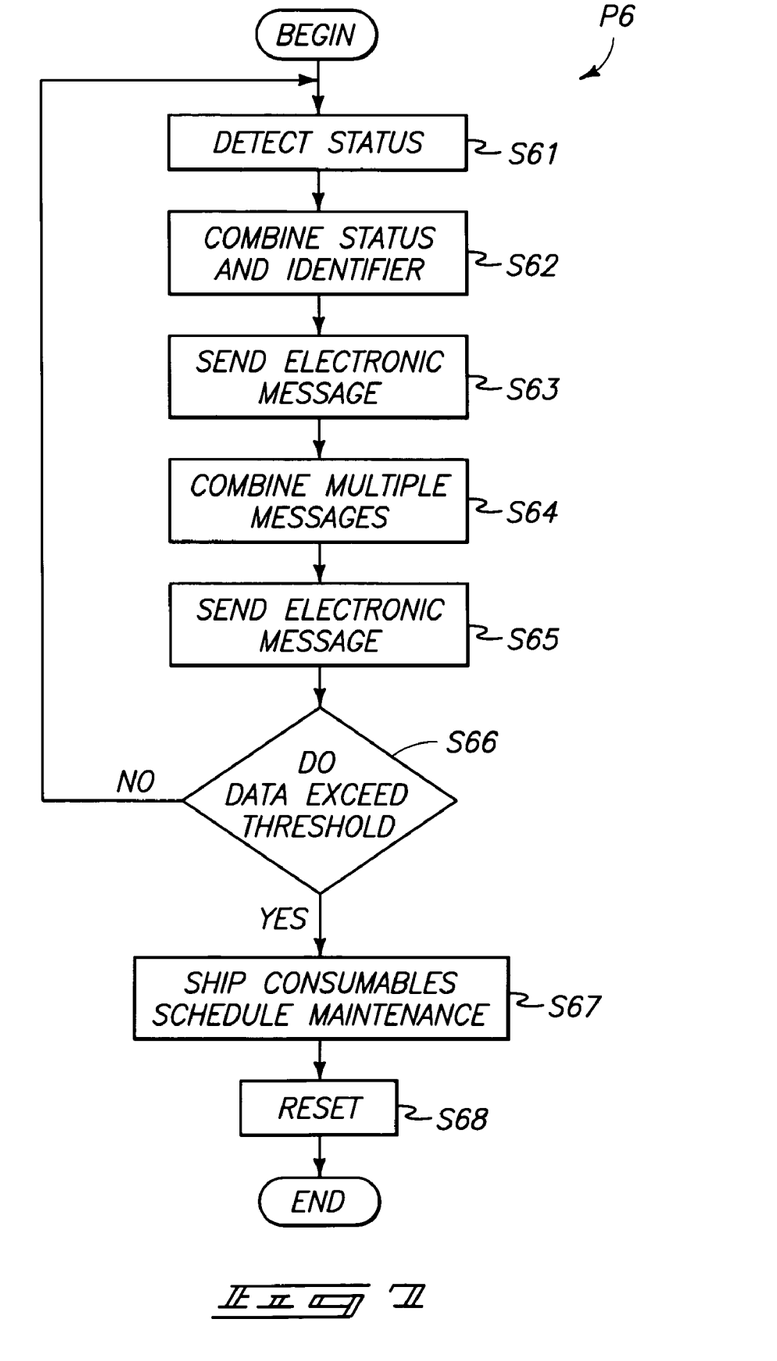

FIG. 6 is a simplified flowchart of a process P5 for configuring a peripheral device, such as a hard copy output engine, using the information collected via the processes P1 through P4 of FIGS. 2 through 5, in accordance with an embodiment of the present invention.

In one embodiment, the data collected by the processes P1 through P4 are used to derive XML configuration data in a step S51.

These data are then emailed from the vendor web site to the network 10 in a step S52. In one embodiment, the data are emailed directly to the embedded web server 26 of the hard copy output engine 14 or other peripheral device in the step S52.

In one embodiment, the data are emailed to a responsible party for review in the step S52. In this embodiment, the data are forwarded, for example via email, to the embedded web server 26 after review by the responsible party in an optional step S53.

In a step S54, the XML configuration data interact with the embedded web server 26 to set thresholds in the peripheral device, such as the hard copy output engine 14.

In one embodiment, the data collected by the processes P1 through P4 are used to derive XML configuration data that are then emailed to the network 10 in the step S52. In one embodiment, a CGI script is used to convey the configuration data.

The process P5 then ends.

While the flowcharts of FIGS. 2 through 6 assume that separate individuals fill the roles of MIS manager, maintainer, purchase authorizer and purchaser, it will be appreciated that some or all of these roles may be played by one or more persons, or by more or fewer persons. It will also be appreciated that many of the acts of FIGS. 2 through 6 need not occur in the order in which they are described and may take place contemporaneously.

Benefits include allowing the user to configure the hard copy output engine for ease of ordering and maintaining supplies of consumables. This is accomplished without requiring the user to add software modules or hardware to the network 10. Additionally, the firewall 19 maintains integrity of the system 10.

The process P6 is initiated at a step S61 wherein status of a consumable and/or predetermined work of a peripheral device are detected.

At a step S62, the status detected in step S61 is collated with an identifier of the peripheral device to which the status pertains.

At a step S63, an electronic message is sent to an appropriate recipient, such as a maintainer and/or authorized purchaser, regarding the status and the respective identifier.

At a step S64, the maintainer operates to collate messages regarding status and identifiers of multiple peripheral devices associated with the recipient.

At a step S65, the recipient sends an electronic message to the vendor website regarding the status and identifiers of the respective peripheral devices.

At a step S66, it is determined whether data from the status exceeds appropriate thresholds of the respective peripheral devices.

If the condition of step S66 is negative, the process PB may revert back to step S61.

If the condition of step S66 is affirmative, the process P6 may proceed to a step S67 wherein consumables are shipped and/or maintenance is scheduled depending upon the status of the peripheral devices.

At a step S68, the status may be reset for subsequent monitoring and comparison.

The protection sought is not to be limited to the disclosed embodiments, which are given by way of example only, but instead is to be limited only by the scope of the appended claims.

What is claimed is:

1. An imaging device configuration method comprising:
receiving information regarding a plurality of imaging devices of a plurality of groups of a common network, each of the plurality of groups based on internal business structures associated with the common network, wherein the receiving comprises receiving from separate maintainers identified for each of the plurality of groups using an external device of a vendor which is external of the common network;
using the external device, communicating a message regarding the imaging devices of one of the groups;
using the external device, receiving data regarding the imaging devices of the one of the groups responsive to the communicating the message;
using the external device, generating configuration information using the data, wherein the configuration information is usable to configure the imaging devices of the one of the groups; and
using the external device, communicating a communication comprising the configuration information.

2. The method of claim 1 further comprising identifying an individual associated with the one of the groups, and wherein the communicating comprises communicating the communication to the individual and the receiving comprises receiving the data from the individual.

3. The method of claim 2 further comprising configuring the imaging devices of the one of the groups by the individual using the configuration information.

4. The method of claim 3 wherein the imaging devices and the common network are resources of an entity, the individual is authorized to configure the imaging devices of the one of the groups of the entity, and wherein the imaging devices of the one of the groups are used by people of the entity who are different than the individual.

5. The method of claim 1 wherein the common network comprises a firewall, and further comprising receiving a plurality of executable instructions using an internal device inside of the firewall from the external device, executing the executable instructions using the internal device to discover the imaging devices of the common network, and communicating identification information regarding the imaging devices to the external device after the discovering.

6. The method of claim 1 further comprising downloading a device discovery plug-in via a web browser of the maintainer.

7. The method of claim 6 wherein the plug-in takes configuration data from a website of the vendor and configures the imaging devices in at least one of the plurality of groups.

8. The method of claim 7 further comprising collating email addresses for maintainers with the sorted groups.

9. The method of claim 1 further comprising sorting device information into the groups.

10. The method of claim 1 further comprising the maintainer launching a web browser using a URL contained in an email message from the external device, the URL specific to a list of imaging devices for each of the plurality of groups.

11. A imaging device management method comprising:
receiving executable instructions within a common network, the executable instructions including configuration data from a vendor for ease of ordering and maintaining supplies of consumables for a plurality of imaging devices, wherein the executable instructions are received from the vendor externally of the common network and are passed by a firewall of the common network, wherein the plurality of imaging devices are inside of the firewall and are coupled with the common network;
using an internal device inside of the firewall and coupled with the common network, executing the executable instructions to discover the imaging devices and to generate identification information regarding the imaging devices; and
outputting the identification information regarding the imaging devices externally of the common network including passing the identification information through the firewall.

12. The method of claim 11 further comprising outputting a communication externally of the common network, and wherein the receiving comprises receiving the executable instructions responsive to the outputting the communication.

13. An imaging device configuration method comprising:
identifying an individual associated with an organization which has a common network and a plurality of imaging devices coupled with the common network, the individual being a maintainer of a group of the plurality of imaging devices, the group sorted based on internal business structures in the common network, wherein the imaging devices are used by people of the organization other than the individual;
using an external device of a vendor which is external of the common network, sending a message to the individual;
using the external device, receiving data from the individual responsive to the sending; and
after the receiving and using the external device, outputting configuration information used to configure operations of the imaging devices with respect to formation of hard images upon media by the imaging devices, the configuration information including configuration data from a website of the vendor for ease of ordering and maintaining supplies of consumables.

14. The method of claim 13 wherein the outputting comprises communicating the configuration information directly to respective ones of the imaging devices.

15. The method of claim 13 wherein the outputting comprises communicating the configuration information to the individual.

16. The method of claim 13 further comprising downloading a device discovery plug-in via a web browser of the maintainer.

17. The method of claim 13 wherein the plug-in takes configuration data from website of the vendor and configures the imaging devices in at least one of the plurality of groups.

18. The method of claim 13 further comprising sorting device information into the groups.

19. The method of claim 13 further comprising collating email addresses for maintainers with the sorted groups.

20. The method of claim 13 further comprising the maintainer launching a web browser using a URL contained in an email message from the external device, the URL specific to a list of imaging devices for each of the plurality of groups.

* * * * *

UNITED STATES PATENT AND TRADEMARK OFFICE
CERTIFICATE OF CORRECTION

| | | |
|---|---|---|
| PATENT NO. | : 8,131,602 B2 | Page 1 of 1 |
| APPLICATION NO. | : 12/072868 | |
| DATED | : March 6, 2012 | |
| INVENTOR(S) | : Robert E. Haines et al. | |

It is certified that error appears in the above-identified patent and that said Letters Patent is hereby corrected as shown below:

In column 12, line 11, in Claim 17, delete "from" and insert -- from a --, therefor.

Signed and Sealed this
Sixth Day of November, 2012

David J. Kappos
*Director of the United States Patent and Trademark Office*